United States Patent [19]

Robeson et al.

[11] Patent Number: 4,956,095
[45] Date of Patent: Sep. 11, 1990

[54] WATER OR GAS PURIFICATION BY BULK ABSORPTION

[75] Inventors: Lloyd M. Robeson, Macungie; Michael Langsam, Allentown, both of Pa.

[73] Assignee: Air Products and Chemicals, Inc., Allentown, Pa.

[21] Appl. No.: 459,009

[22] Filed: Dec. 29, 1989

[51] Int. Cl.$^5$ .................. B01D 53/14; C02F 1/28
[52] U.S. Cl. ........................ 210/670; 55/58; 55/59; 55/74; 55/77; 210/673; 210/692
[58] Field of Search ............... 55/58, 59, 74, 77–79; 210/670, 673, 692, 675, 676

[56] References Cited

U.S. PATENT DOCUMENTS

| | | | |
|---|---|---|---|
| 4,591,440 | 5/1986 | Higashimura et al. | 210/640 |
| 4,728,343 | 3/1988 | Snyder | 55/59 |
| 4,764,282 | 8/1988 | Snyder | 210/690 |

OTHER PUBLICATIONS

Leeper et al. "Membrane Technology and Applications: An Assessment"; Contract No. AC0-7-761D01570; U.S. Dept. of Energy (Feb. 1989).

Fritz and Tateda; *Analytical Chemistry;* vol. 40; pp. 2115–2119 (1968).
Paleos; *J. Colloid and Interface Science;* vol. 31; pp. 7–18 (1969).
Aptel et al; *J. Membrane Science;* vol. 1; pp. 271–287 (1976).
Cabasso, et al; *J. Polymer Science;* Polymer Letters to the Editor; vol. 23, pp. 577–581 (1985).
Masuda, et al; *Macromolecules;* vol. 18; pp. 841–845 (1985).
Masuda, et al; *Advances in Polymer Science;* vol. 81; pp. 121–165 (1986).
Masuda, et al; *Polymer Journal;* vol. 18; pp. 565–567 (1986).
Masuda, et al; *J. Polymer Science;* Part A; Polymer Chemistry; vol. 25; pp. 1353–1362 (1987).

*Primary Examiner*—Ivars Cintins
*Attorney, Agent, or Firm*—Mark L. Rodgers; William F. Marsh; James C. Simmons

[57] ABSTRACT

Water or gas containing organic impurities is purified by contact with a poly(trialkylsilylpropyne), such as poly[1-(trimethylsilyl)-1-propyne], operating as a bulk absorbent. Regeneration of the absorbent can be by vacuum or a stream of air.

6 Claims, No Drawings

WATER OR GAS PURIFICATION BY BULK ABSORPTION

TECHNICAL FIELD

This invention relates to a method of removing trace organic impurities from water or air using a polymer bulk absorbent.

BACKGROUND OF THE INVENTION

The contamination of drinking water sources with organic impurities, especially in industrialized areas, is a major environmental concern. Such impurities commonly include chlorinated hydrocarbons as well as aromatics such as benzene. A common method which addresses this problem is to pass the contaminated water through beds of activated carbon, which removes the impurities by surface adsorption. Other methods of purification which have been developed include distillation, extraction, and membrane separation.

Air contamination with toxic organic chemicals is another health hazard which commands attention. Air is also purified in industrial operations requiring "clean rooms". The use of filtration and adsorption techniques is common in addressing air purification problems.

In addition to activated carbon a variety of polymeric adsorbents have been developed and used successfully for water purification. Fritz and Tateda, *Analytical Chemistry.* Volume 40, pages 2115–2119 (1968) disclose products of Rohm and Haas which are marketed under the Amberlite trademark. For example. A-26 is described as a macroreticular ion exchange resin. Other products of this type are described by Paleos, *J. Colloid and Interface Science.* Volume 31. page 7–18 (1969), including the Amberlite species designated as XAD-2,4,7, and 8. The product literature of Rohm and Haas describes these products as forms of cross-linked polystyrene or cross-linked poly(methylmethacrylate) with and without functional groups. It is stated that these resins adsorb polar solvents from non-polar solvents based upon the surface properties of the insoluble beads of the porous polymer and, therefore, are capable of removing contaminants from aqueous systems. The method of operation of these products in removing the contaminants from water is through adsorption of the contaminants on the surface of the polymer and polymer efficiency is increased by increasing its surface area.

The concentration of organic vapors in air space, such as in a storage vessel can be reduced by absorption using particulate vulcanized rubber as the absorbing medium, according to U.S. Pat. No. 4,728,383, Snyder (1988). U.S. Pat. No. 4,764,282, Snyder (1988) discloses using ground rubber to absorb toxic organic chemicals for transportation and incineration.

Other methods of water purification involve the use of membranes, also known as pervaporation. Aptel et al., *J. Membrane Science,* Volume 1, pages 271–287 (1976) disclose that positive azeotropic liquid systems, such as water and alcohol, are separated by pervaporation through a membrane of poly(tetrafluoroethylene) grafted with N-vinylpyrrolidone, enhanced with a temperature gradient driving force. The purification of wastewater containing organic materials is discussed by Leeper et al., "Membrane Technology and Applications: An Assessment", contract number AC07-761D01570; U.S. Department of Energy (Feb. 1989). This report describes the treatment of water contaminated with oils by energy intensive distillation, air flotation or with ultrafiltration, and also notes that phenol containing water systems have been purified using membrane separation techniques. Cabasso et al., *J. Polymer Science;* Polymer Letters to the Editor, Volume 23, pages 577–581 (1985), disclose sulfonated polyethylene ion exchange membranes for the separation of alcohol-water mixtures.

Masuda et al., *Macromolecules.* Volume 18, page 841–845 (1985) disclose that the monomer 1-(trimethylsilyl)-1-propyne can be polymerized by catalysts based upon pentahalides of niobium or tantalum and that the high molecular weight polymer thus formed makes tough films on casting. Masuda et al., *Advances in Polymer Science,* Volume 81, pages 121–165 (1986) also describe the synthesis of substituted polyacetylenes, including poly(trialkylsilylpropynes), and state that some of the polymers are useful as membranes for the separation of gases and liquids. A membrane formed with poly[1-(trimethylsilyl)-1-propyne] was disclosed as useful in pervaporation of ethanol-water mixtures and it is stated that such a membrane is ethanol-permselective. Such separation is further discussed by Masuda et al., *Polymer Journal,* Volume 18, pages 565–567 (1986) and Masuda et al., *J. Polymer Science.* Part A, Polymer Chemistry, Volume 25, pages 1353–1362 (1987), who describe this polymer as having extremely high oxygen permeability.

In pervaporation membrane separation processes, the more permeable component of a liquid mixture passes through the membrane at a faster rate relative to the feed composition, thus yielding a separation of components. Poly[1-(trimethylsilyl)-1-propyne)](PTMSP), is of particular interest for pervaporation applications due to its very high diffusion coefficient and the ability to transport organic molecules faster than water. Permeation rate is a product of the diffusion coefficient and solubility constant. For separation of organic trace impurities from water, the high solubility factor ratio of organics/water yields a favorable separation of organics versus water through a PTMSP membrane. This favorable separation is diminished however, by the unfavorable diffusion coefficient ratio, where water (as a smaller molecule) has a higher value than the organics, thus yielding a decrease in the overall permeability separation factor compared to the solubility factor.

SUMMARY OF THE INVENTION

We have discovered that poly(trialkylsilylpropynes) function surprisingly well in water and gas purification applications, not as a membrane in pervaporation, but as a bulk absorbent. By using the polymer in this fashion, mass transfer limitations are virtually eliminated. Also, the complex construction of membrane structures are made unnecessary when practicing this invention, because the polymer is used in a bulk granular or particulate form. Using a fixed bed absorption method according to this invention, the decrease in selectivity due to high water diffusion coefficients (relative to the organic chemical contaminants) is eliminated. The solubility coefficient ratio between the polymer and water (for example, PTMSP/water) is the separation factor of interest. Of course, a high diffusion coefficient is desired in order to eliminate diffusion-limited mass transfer in the fixed bed. A fixed bed of PTMSP offers the highest diffusion rate of penetrants existing for known polymeric materials. In addition, the polymeric material when used as an absorbent in bulk form can be readily regenerated.

A process is thereby provided by this invention for removing trace organic impurities from water or gas by passing water or gas containing such impurities into a zone where it contacts a bulk absorbent comprising solid insoluble polymer of a monomer having the general formula:

$$H_3C-C\equiv C-SiR_3$$

wherein each R is methyl or ethyl, contacting the water or gas with the absorbent, and then removing the purified water or gas from the contact zone.

DETAILED DESCRIPTION OF THE INVENTION

The poly(trialkylsilylpropynes) which are used as bulk adsorbents for water and gas purification in this invention can be synthesized by known procedures which are described in the references of Masuda et al., cited above, particularly the articles in *Macromolecules* and *Advances* in *Polymer Science*. The procedure described in these references polymerizes the monomer using catalyst based on Group 5 and 6 transition metals, such as niobium, tantalum, molybdenum and tungsten. High molecular weight polymers, having weight average molecular weights on the order of $10^5$ to $10^6$, are formed from 1-(trimethylsilyl)-1-propyne using catalysts formed from pentahalides or pentabromides of niobium or tantalum. The polymerization is carried out in toluene at 80° C. Polymers thus prepared can be used in the present invention over a broad range of possible molecular weights, provided they are solid and insoluble in water.

The poly(trialkylsilylpropynes) used in this invention have an unexpectedly high distribution coefficient of organics between the polymer and water, defined as the ratio: (weight organic sorbed/weight polymer) divided o by the ratio: (weight organic in water phase/weight water). Also, organics have a high diffusion coefficient into these polymers. This high distribution coefficient yields excellent separation of water from dissolved organics when the polymers are contacted with contaminated water in a static mode, i.e. not requiring transport through a membrane. Unlike conventional techniques which operate under an adsorption mode (surface sorption), such as activated carbon or the Amberlite resins discussed above, the polymers used according to this invention operate under an absorption mode (that is bulk sorption) and, therefore, The structural features of the form of the polymer is not relevant. In other words, it is not necessary to maximize surface area.

The polymer can be used in a granular or pelletized form or as compacted or coagulated powders or preforms, and can be used in either a fixed bed. moving bed or slurried with the contaminated water or gas streams and thereafter separated by filtration. Preferably, the operation is with a packed fixed bed with the polymer in a granular form. Multiple beds can be operated in a series or in parallel form with alternating absorption and regeneration cycles. Air is the primary gas stream of interest. Gaseous streams other than air are also considered of interest for removal of trace contaminants by poly(trialkylsilylpropyne). Examples include trace halogenated hydrocarbon removal from various gas streams (e.g. He, CH4 and the like), and removal of oil contamination from gas streams (e.g. aerosol size oil particles) by passing the gas stream through a fixed bed of poly(trialkylsilylpropyne) particles. Additionally, this material can be used to replace carbon in cannisters used to capture and remove hydrocarbons from solvent storage tanks or automobile gas tanks.

One of the advantages of this invention is the ease with which the absorbent can be regenerated using either vacuum or air forced through the bed to remove organic contaminants. The very high diffusion coefficient of organics, which leads to rapid desorption, makes regeneration of a fixed bed very convenient and provides a clear advantage over adsorbents which often require steam or heat for regeneration. In gas regeneration of absorbent used to remove organics from gas in a purification operation, the regenerating gas is heated to facilitate desorption. Vacuum desorption is favored to reduce the volume of contaminating vapors. An advantage for the poly(trialkylsilylpropyne) versus activated carbon is that various forms of this polymer (i.e., powder, films, porous sheets, fibers, etc.) can be fabricated offering much more versatility in the geometrical forms for the subject application. A bed of poly(trialkylsilylpropyne) powder could be compressed to remove excess water prior to evacuation to remove sorbed contaminants, thus offering another advantage over activated carbon.

It is also possible to use the poly(trialkylsilylpropyne) as a bulk absorbent in combination with lower cost materials, such as silicone rubber particles, polyethylene (especially low density polyethylene), polypropylene, poly(4-methylpentene-1) and other bulk adsorbents which can be combined in a mixture with the poly(trialkylsilylpropyne) or used in parallel columns to yield a maximum cost/benefit performance. Also, columns in series containing other adsorbents or absorbents such as activated carbon can be used to provide higher efficiency in a particular operation.

Additional features and embodiments of our invention are disclosed in the following examples which should be construed as illustrative and not to limit the invention unduly.

EXAMPLE 1

A solution of 1744 ppm of chloroform in water was prepared via injection of chloroform into distilled water followed by agitation until the chloroform was completely dissolved. A 100 ml buret was filled with granular poly(trimethylsilylpropyne) (PTMSP) (15.5 grams). The solution was poured into the buret and allowed to sit for 30 minutes after which an approximately 30 ml sample was removed for analysis. The buret was refilled with the above water solution containing CHCl3. A sample was removed after 2 hours exposure in the buret and the buret was refilled. Another sample was taken after 5 hours in the buret. To 200 ml of the water solution noted above containing CHCl3, 20 grams of PTMSP granules were added and agitated briefly and allowed to sit for 3 hours after which a water sample was removed for analysis. The results on CHCl3 concentration in the water samples are listed in Table 1. A gas chromatograph with a flame ionization detector was used for analysis.

TABLE 1

| Analysis of CHCl3 Content of Water Sources | |
|---|---|
| Sample Description | CHCl3 Content (ppm) |
| Control | 1744 |

TABLE 1-continued

Analysis of CHCl₃ Content of Water Sources

| Sample Description | CHCl₃ Content (ppm) |
|---|---|
| After 30 minutes in buret | 1.7 |
| After 2 hours in buret | 1.1 |
| After 5 hours in buret | 2.6 |
| Sample of 200 ml water (control) after 3 hours exposure to 20 grams of PTMSP | 18.3 |

The above data show the effectiveness of the invention in removing a chlorinated hydrocarbon impurity from water by bulk absorption.

EXAMPLE 2

This example demonstrates the removal of CHCl₃ from water in a dynamic mode of operation. Two burets were connected in series. The first buret was the same employed in Example 1 (containing 15.5 grams of PTMSP) which had been subjected to vacuum to regenerate the column. The second buret was packed with 15.1 grams of PTMSP. The control solution contained 3917 ppm of CHCl₃ and was continuously added to the buret at an average rate of 11.9 grams/minute. Samples were taken at various intervals from the second column for analysis. Total running time was 4 hours and 20 minutes. A sample was also taken after 4 hours running time for the first buret to see if breakthrough had occurred. The results are given in Table 2. Note that a break in the run was taken after 2 hours and 40 minutes running time. After 1 hour and 35 minutes, the process was restarted until 4 hours and 20 minutes actual running time had elapsed. The results clearly demonstrate the ability of PTMSP to remove CHCl₃ from water. It is even more surprising to note that at the end of the test the water out of the second buret had been reduced to 1 ppm whereas a material balance shows 12.1 grams of CHCl₃ had been absorbed by 30.6 grams of PTMSP (39.5 wt % sorption). Thus the PTMSP column is quite saturated with CHCl₃ but still retains the ability to remove CHCl₃ from the water. At the end of 4 hours, breakthrough was occurring for the first buret.

TABLE 2

Analysis of CHCl₃ Content of Water Samples

| Time of Running | CHCl₃ Content (ppm) | Total Water Eluted (grams) |
|---|---|---|
| 0 (control) | 3917 | 0 |
| 8 minutes | 4.4 | 95.2 |
| 32 minutes | 4.1 | 380.8 |
| 1 hour 15 minutes | 2.3 | 892.5 |
| 1 hour 45 minutes | 1.6 | 1250 |
| 2 hours 10 minutes | 1.5 | 1547 |
| 2 hours 30 minutes | 1.6 | 1785 |
| 3 hours | 1.3 | 2142 |
| 3 hours 20 minutes | 1.4 | 2380 |

TABLE 2-continued

Analysis of CHCl₃ Content of Water Samples

| Time of Running | CHCl₃ Content (ppm) | Total Water Eluted (grams) |
|---|---|---|
| 4 hours | 1.9 | 2856 |
| 4 hours 20 minutes | 0.9 | 3094 |
| 4 hours (out of 1st buret) | 740 | 2856 |

EXAMPLE 3

This example shows the ability of PTMSP to remove methyl ethyl ketone (MEK) from water. A solution of 1.34 wt % MEK in water was prepared. A 100 ml buret was filled with 14.5 grams of PTMSP granular material. Samples of water were taken from the buret after 30 minutes. 1 hour, and 3 hour exposure intervals. The water level was refilled in the buret after each sample with the MEK/water solution noted above. The sample taken for each analysis was approximately 30 grams. Additionally, a jar containing 17.5 grams was filled with 175 ml. of the MEK/water solution noted above. A water sample was taken after 2 hours exposure. The results are listed in Table 3. These results are not as not as dramatic as with CHCl₃ but do demonstrate the ability of PTMSP to remove MEK from water in an absorbent mode.

TABLE 3

Analysis of MEK content in Water Samples

| Sample Description | MEK Content |
|---|---|
| Control | 1.34% |
| After 30 minutes in buret | 0.16% |
| After 1 hour in buret | 0.19% |
| After 3 hours in buret | 0.22% |
| After 2 hours in sealed jar | 0.42% |
| Distribution coefficient | = 1.61 grams MEK/17.5 grams of PTMSP |
| (from sealed jar experiment) | 0.735 grams MEK/175 grams of water |
| | = 21.9 |

EXAMPLE 4

This example shows the removal of trichloroethylene (TCE) from a water in a dynamic mode of operation. As with Example 2, two burets were connected in series. The first buret was the same employed in Example 2 containing 15.1 grams of PTMSP and the second buret also used in Example 2 contained 15.5 grams of PTMSP. Both burets had been regenerated by pulling a vacuum on the for over 4 hours. A control solution of 728 ppm trichloroethylene in 3000 m of water was prepared and was added continuously to the first buret. Sample were taken at various intervals from both the first and second burets. Total running time was 4 hours and the average rate of water addition to the column was 15.0 grams per minute. The analyses of the water samples taken from the burets are noted in Table 4.

TABLE 4

Analysis of Trichloroethylene in Various Water Samples

| Time of Running | Source | TCE Content (ppm) | Water Eluted |
|---|---|---|---|
| 0 (control) | control | 728 | 0 |
| 30 minutes | 2nd buret | <0.5 | 449 grams |
| 1 hour | 2nd buret | <0.5 | 897 grams |
| 1 hour | 1st buret | 1.20 | 897 grams |
| 2 hours | 2nd buret | <0.5 | 1794 grams |
| 2 hours | 1st buret | 1.26 | 1794 grams |
| 3 hours | 2nd buret | <0.5 | 2691 grams |
| 3 hours | 1st buret | 2.02 | 2691 grams |
| 4 hours | 2nd buret | <0.5 | 3588 grams |

TABLE 4-continued

Analysis of Trichloroethylene in Various Water Samples

| Time of Running | Source | TCE Content (ppm) | Water Eluted |
|---|---|---|---|
| 4 hours | 1st buret | 2.05 | 3588 grams |

EXAMPLE 5

This example shows the operation of PTMSP as a bulk absorbent to remove toluene from water. To prepare the solution, 1.6 ml. of toluene was added to 3200 ml. of distilled water and agitated until solution had occurred. Using the vacuum regenerated columns from Example 4, these columns were connected in series as before. The above noted solution was added at a constant rate to the column. The analytical results on the resultant water samples (control and water samples eluting the first and second buret) are listed in Table 5. The analysis was done with a Hewlett-Packard 5890 gas chromatography system with flame ionization detection. External standard calibration was conducted to quantify the results.

TABLE 5

Analytical Results on Toluene Content in Various Water Samples

| Sample Description Time of Running | Source | Toluene Content (ppm) | Water Eluted (grams) |
|---|---|---|---|
| Control | | 405 | 0 |
| 30 minutes | 2nd buret | >1 | 419 |
| 1 hour | 2nd buret | >1 | 860 |
| 2 hours | 2nd buret | >1 | 1649 |
| 2 hours | 1st buret | >1 | 1649 |
| 3 hours | 2nd buret | >1 | 2540 |
| 3 hours | 1st buret | >1 | 2540 |
| 4 hours | 2nd buret | >1 | 3365 |
| 4 hours | 1st buret | >1 | 3365 |
| Water sample taken from sealed jar containing 150 ml. of toluene/water mixture and 15 grams of PTMSP; after 1 hour and 30 minutes exposure. | | >1 | |

EXAMPLE 6

To compare PTMSP with activated carbon, side-by-side run were set up to operate both columns to breakthrough and then to regenerate them. The PTMSP columns utilized in series were the same as used in previous examples (30.6 grams of PTMSP) which had been vacuum regenerated several times and again for this example. The activated carbon column was filled with 49.2 grams of activated carbon. The control water source was prepared by dissolving 15.0 grams of $CHCl_3$ in 3000 ml of distilled water. The $CHCl_3$ content on the eluted water streams is noted in Table 6. The results show that activated carbon is more efficient is lowering the $CHCl_3$ content (it must be pointed out that the poorer performance of the PTMSP versus activated carbon may be due to channeling which is believed present in the PTMSP columns), as the pressure drop in the activated carbon columns is significantly higher than the PTMSP columns. The breakthrough position for both columns occurred at similar positions of grams of water eluted/grams of column packing. The results are believed accurate at low ppm levels. At the high ppm levels, however, the calibration did not properly extrapolate to yield expected values based on the initial concentration. This problem was corrected in Examples and 8.

TABLE 6

Analysis Results of $CHCl_3$ in Water After Column Elution

| Time of Running | Source | $CHCl_3$ Content (ppm) | Water Eluting Column (grams water/ grams of column packing) |
|---|---|---|---|
| 0 (Control) | (Control) | 1334 | — |
| 30 minutes | Activated Carbon | 0.12 | 7.22 |
| 30 minutes | PTMSP | 2.8 | 13.7 |
| 1 hour | Activated Carbon | 0.16 | 14.5 |
| 1 hour | PTMSP | 2.7 | 26.1 |
| 2 hours | Activated Carbon | 0.066 | 31.0 |
| 2 hours | PTMSP | 4.24 | 51.2 |
| 3 hours | Activated Carbon | 0.077 | 47.4 |
| 3 hours | PTMSP | 2.61 | 79.4 |
| 4 hours | Activated Carbon | 0.75 | 64.2 |
| 4 hours | PTMSP | 67.8 | 107.1 |
| 5 hours | Activated Carbon | 1.69 | 81.2 |
| 5 hours | PTMSP | 246.8 | 134.6 |
| 6 hours | Activated Carbon | 6.76 | 97.4 |
| 6 hours | PTMSP | 711.4 | 161.1 |
| 7 hours | Activated Carbon | 15.6 | 113.5 |
| 7 hours | PTMSP | 998.6 | 187.9 |
| 8 hours | Activated Carbon | 173.5 | 129.7 |
| 8 hours | PTMSP | 1226 | 214.2 |
| 9 hours | Activated Carbon | 689 | 144.4 |
| 9 hours | PTMSP | 1224 | 238.8 |
| 10 hours | Activated Carbon | 971 | 161.7 |
| 10 hours | PTMSP | 1314 | 265.8 |

EXAMPLE 7

This example demonstrates the efficiency of vacuum to regenerate the columns. The PTMSP columns were connected to a vacuum source (vacuum pump) and a slow leak at the end of the column was allowed in order to remove the sorbed organics (time connected was 8 hours). Likewise, activated carbon was connected to the same vacuum source (the next day) and a slow leak at the end of the column was allowed to improve the removal of sorbed organics; again the time of connection was 8 hours. The columns were then reassembled and the procedure of Example 6 was repeated. The results on chloroform removal are listed in Table 7.

TABLE 7

Analysis Results of $CHCl_3$ in Water After Column Elution

| Time of Running | Source | $CHCl_3$ Content (ppm) | Water Eluting Column (grams water/ grams of column packing) |
|---|---|---|---|
| 0 (Control) | | 3316 | 0 |
| 30 minutes | Activated Carbon | 16.5 | 6.6 |
| 30 minutes | PTMSP | 1.0 | 14.1 |
| 1 hour | Activated Carbon | 16.5 | 14.1 |
| 1 hour | PTMSP | 1.2 | 25.8 |
| 2 hours | Activated Carbon | 15.1 | 30.2 |
| 2 hours | PTMSP | 1.5 | 51.6 |
| 3 hours | Activated Carbon | 14.2 | 43.7 |
| 3 hours | PTMSP | 3.8 | 75.2 |
| 4 hours | Activated Carbon | 19.1 | 55.5 |
| 4 hours | PTMSP | 7.2 | 102.0 |
| 5 hours | Activated Carbon | 20.9 | 72.1 |
| 5 hours | PTMSP | 18.0 | 127.4 |
| 6 hours | Activated Carbon | 17.2 | 86.4 |
| 6 hours | PTMSP | 62.0 | 148.8 |
| 7 hours | Activated Carbon | 51.3 | 100.7 |
| 7 hours | PTMSP | 159.6 | 171.2 |
| 8 hours | Activated Carbon | 462.4 | 118.0 |
| 8 hours | PTMSP | 1687 | 197.2 |
| 9 hours | Activated Carbon | 3439 | 135.2 |

TABLE 7-continued

Analysis Results of CHCl₃ in Water After Column Elution

| Time of Running | Source | CHCl₃ Content (ppm) | Water Eluting Column (grams water/ grams of column packing) |
|---|---|---|---|
| 9 hours | PTMSP | 2345 | 224.9 |

The above data show that for the first five hours of these runs, the regenerated PTMSP was more effective than the regenerated activated carbon. Even at breakthrough (8 hours for PTMSP and 9 hours for activated carbon) the PTMSP had treated a higher volume of water.

EXAMPLE 8

The columns in this example were identical to those of Example 7 where a vacuum induced air sweep of the columns was utilized to regenerate the columns 8 hours for the activated carbon; and 8 hours for the PTMSP columns in parallel: both regenerations using a single, and identical line source). The columns were set up and run as before with a solution of 15 grams of CHCl₃ in 3000 grams of water used as the control feed source. The results are listed in Table 8. These samples were analyzed by gas chromatography with an electron capture detector to determine the amount of chloroform present. This procedure appears to give improved quantitative results at the higher CHCl₃ concentrations.

TABLE 8

| Time of Running | Source | CHCl₃ Content (ppm) | Water Eluting Column (grams water/ grams of column packing) |
|---|---|---|---|
| 0 (Control) | Control | 5341 | 0 |
| 30 minutes | Activated Carbon | 41.9 | 8.78 |
| 30 minutes | PTMSP | 7.7 | 14.8 |
| 1 hour | Activated Carbon | 51.8 | 15.7 |
| 1 hour | PTMSP | 2.9 | 28.2 |
| 2 hours | Activated Carbon | 52.1 | 31.3 |
| 2 hours | PTMSP | 9.9 | 57.9 |
| 3 hours | Activated Carbon | 53.5 | 48.6 |
| 3 hours | PTMSP | 40.5 | 89.1 |
| 4 hours | Activated Carbon | 47.7 | 64.3 |
| 4 hours | PTMSP | 91.8 | 117.4 |
| 5 hours | Activated Carbon | 75.6 | 81.8 |
| 5 hours | PTMSP | 158.8 | 143.6 |

Again, the data show the regenerated PTMSP to be more effective than regenerated activated carbon for the first three hours before breakthrough occurred.

EXAMPLE 9

The distribution coefficients of CHCl₃ between water and solid phase absorbents were determined using a control solution of ~15 grams of CHCl₃ in 3000 ml of distilled water. Various solids, including Exxon low density polyethylene (LLDPE) and Union Carbide very low density polyethylene (VLDPE) were placed in sealed containers containing 200 ml of the control solution for 20 hours. The CHCl₃ analyses on the control solution after exposure to various absorbents are noted in Table 9.

TABLE 9

| Sample Description | CHCl₃ Concentration* | Distribution Coefficient |
|---|---|---|
| Control CHCl₃/water solution | 6479 ppm | — |
| 200 ml of CHCl₃/water solution in contact with 1.2 grams of PTMSP | 1275 ppm | 680 |
| 200 ml of CHCl₃/water solution in contact with 2.5 grams of PTMSP | 408 ppm | 1191 |
| 200 ml of CHCl₃/water solution in contact with 5.0 grams of PTMSP | 192 ppm | 1310 |
| 200 ml of CHCl₃/water solution in contact with 10 grams of PTMSP | 83 ppm | 1541 |
| 200 ml of CHCl₃/water solution in contact with 20 grams of PTMSP | 35.2 ppm | 1831 |
| 200 ml of CHCl₃/water solution in contact with 20 grams of LLDPE (Control Example A) | 2012 ppm | 22.2 |
| 200 ml of CHCl₃/water solution in contact with 200 ml of VLDPE (Control Example B) | 1540 ppm | 32.0 |

*Determined with gas chromatograph with an electron capture detector.

Distribution coefficient = (grams CHCl₃ (in absorbent)/gram of absorbent/(grams CHCl₃ (in H₂O)/grams of H₂O)

The distribution coefficient for CHCl₃ between the polymer absorbent phase and water is much larger for PTMSP than the two polyethylene samples noting a significant advantage of PTMSP over polyethylene as an absorbent material.

EXAMPLE 10

This example was performed to demonstrate the efficiency of PTMSP as a bulk absorbent to remove trace amount of multicomponent hydrocarbons from water. Two columns of 23.1 and 21.3 grams of PTMSP (100 ml burets) were connected in series. For comparison with activated carbon, a column with 44.4 grams Fischer Brand activated carbon 6–14 mesh; Cat. No. 05-685A was prepared A sample of 300 ml distilled water containing ~3 g trichloroethylene, ~2 grams of toluene, and ~15 grams of chloroform were added and vigorously agitated until a homogeneous solution was obtained. This solution was added to the noted columns utilized in dynamic mode of operation and water samples were obtained at various elution times. The results are noted in Table 10.

TABLE 10

| Sample Description | Trichloroethylene Concentration | Toluene Concentration | Chloroform Concentration | Water Eluting Column (grams H₂O) |
|---|---|---|---|---|
| Control Solution | 972 ppm | 417 ppm | 4609 ppm | — |
| Water Sample from Activated Carbon Column (1 hour) | 0.1 | 0 | 0 | 1035 |
| Water Sample from PTMSP Column (1 hour) | 1.8 | 0 | 1.6 | 1671 |
| Water Samples from Activated Carbon Column (2 hours) | 0 | 0 | 0.17 | 2403 |

TABLE 10-continued

| Sample Description | Trichloro-ethylene Concentration | Toluene Concentration | Chloroform Concentration | Water Eluting Column (grams H₂O) |
|---|---|---|---|---|
| Water Sample from PTMSP Column (2 hours) | 3.8 | 0 | 4.4 | 3135 |
| Water Sample from Activated Carbon Column (3 hours) | 0 | 0 | 6.8 | 3465 |
| Water Sample from PTMSP Column (3 hours) | 4.4 | 0 | 11.1 | 4806 |
| Water Sample from Activated Carbon Column (4 hours) | 0 | 0 | 3.9 | 4479 |
| Water Sample from PTMSP (Column 4 hours) | 2.7 | 0 | 14.9 | 6063 |
| Static Water Sample from 200 grams of control solution with 10 grams of Activated Carbon | 2.3 | 1.3 | 83.1 | — |
| Static Water Sample from 200 grams of control solution with 10 grams of PTMSP | 17.0 | 6.5 | 112.9 | — |

The above data show that PTMSP compares well with activated carbon in multi-component removal. The specific advantages however for PTMSP would be in the ability to regenerate the column.

CONTROL EXAMPLE 11

To a 100 ml buret; 55.1 grams of a linear, low density polyethylene (Exxon) was added. A solution >1 ml of chloroform in 500 ml of distilled water was prepared and poured into the buret and added to replenish the column after samples were taken (~30 ml). To 200 ml of the chloroform water solution; 20 grams of the LLDPE were added for static sorption studies. The results on the chloroform analysis on various water samples are noted in Table 11.

TABLE 11

| Sample Description | Chloroform Analysis* |
|---|---|
| Control | 3067 ppm |
| Sample taken after 30 minutes in buret | 22.6 ppm |
| Sample taken after 2 hours in buret | 23.7 ppm |
| Water sample after 2 hours exposure to control solution (20 grams LLDPE/200 ml CHCl₃ solution) | 1338 ppm |

*Determined using flame ionization detector on gas chromatograph.

CONTROL EXAMPLE 12

To a 100 ml buret, 36.2 grams of a very low density polyethylene (DGH-0840H: Union Carbide) was added. A solution of ~1 ml of chloroform in 500 ml of distilled water was prepared. The chloroform/water solution was added to the buret and added to replenish column after samples (~30 ml were taken). 25 grams of the VLDPE (DGH-0840H were added to a sealed jar containing the control chloroform/water solution. The results on the chloroform analysis on various water samples are noted in Table 12.

TABLE 12

| Sample Description | Chloroform Analysis* |
|---|---|
| Control | 3736 ppm |
| Sample taken from buret after 30 minutes | 7.3 |
| Sample taken from buret after 2 hours | 9.7 |
| Sample taken from buret after 4 hours | 13.2 |
| Sample removed after 2 hours in contact with VLDPE (25 grams) in sealed jar with 200 ml of chloroform/water solution (control) | 1063 |

*Determined using flame ionization detector on gas chromatographic column.

CONTROL EXAMPLE 13

A 100 ml buret was filled with 47.6 grams of 8130 Carlisle Baker rubber particles. A solution of 3000 ml of H₂O with ~15 gr. CHCl₃, ~3 gr. trichloroethylene, and ~2 gr. toluene was prepared and agitated until homogeneous. The solution was added to the column for evaluation of absorbent characteristics. Static equilibrium experiments were also performed on this rubber particle samples as well as several other rubber particulate samples. The water analysis results are listed in Table 13.

TABLE 13

| Sample Description | Trichloro-ethylene Concentration | Toluene Concentration | Chloroform Concentration | Water Eluting Column (grams H₂O) |
|---|---|---|---|---|
| Control solution | 741 ppm | 289 ppm | 3285 ppm | — |
| Sample eluting column (one hour) | 3.6 | 0 | 256 | 1158 |
| Sample eluting column (2 hours) | 2.1 | 0.1 | 1105 | 2307 |
| Static sample (200 ml of control + 10 grams of 8130 Carlisle Baker rubber) | 41 | 13.7 | 747 | — |
| Static sample (200 ml of control + 10 grams | 42 | 15.7 | 712 | — |

TABLE 13-continued

| Sample Description | Trichloro-ethylene Concentration | Toluene Concentration | Chloroform Concentration | Water Eluting Column (grams H$_2$O) |
|---|---|---|---|---|
| of TR-20 Baker Rubber Inc. rubber) | | | | |
| Static sample (200 ml of control + 10 grams of WM-40 Baker rubber) | 47 | 16.2 | 792 | — |

In comparison of various rubber samples in Table 13 with the PTMSP results of Table 9, it is clear that PTMSP offers significant absorbent advantages over the various rubber samples in both static and dynamic modes of operation.

EXAMPLE 14

This example illustrates the viability of using PTMSP as an absorbent to selectively remove components of a gas mixture, such as removing toluene vapor from a gas stream comprising nitrogen and toluene.

PTMSP was packed into a column (column dimensions: 1 cm ID×70 cm length; PTMSP: 16 grams total weight; typical particle size ~0.5–2.0 mm irregular chunks) and purged with nitrogen (50 cc/min) for 72 hours. A "control" reading for the nitrogen stream from the PTMSP column was measured using a HP 5890-type GC with one FI detector and a Propak ® Q-type column.

A nitrogen steam (50 cc/min) was passed through a container of toluene cooled to 0° C. and the area count for the toluene peak was measured. After 15 minutes to establish a base line, this nitrogen/toluene vapor stream (50 cc/min) was fed to the bottom of the PTMSP packed column. The off gas from the top of the column was monitored for toluene breakthrough. After about 15 hours there was a sharp breakthrough. This represents 48 liters of gas into 16 gms of PTMSP or 48/16; 3 liters of N$_2$/toluene per gm PTMSP. The control value (time corresponding to 0, 2, 4, 6 minutes) used for this example was approximately 8 mm mercury vapor pressure toluene at 0° C. equal to a toluene concentration in the range of 10,000 ppm.

Changing the flow to pure nitrogen (after 24 hours) resulted in an exponential decay in the toluene content of the nitrogen, indicating the rapid reversal of this adsorption process.

The results of this run are reported in Table 14 below. The first four readings were made on the feed gas, while the remaining measurements were made on the stream leaving the top of the column. The numbers for toluene concentration were calculated by plotting the percent of toluene in the saturated vapor and determining the area of the plot.

TABLE 14

| Time (Min.)* | Duration (Min.)** | Peak Area | Stream |
|---|---|---|---|
| 0 | | 131,977 | Feed |
| 2 | | 132,293 | Feed |
| 4 | | 132,474 | Feed |
| 6 | | 132,199 | Feed |
| 16 | 10 | 200 | Top |
| 26 | 20 | 110 | |
| 36 | 30 | 86 | |
| 46 | 40 | 72 | |
| 56 | 50 | 67 | |
| 66 | 60 | 66 | |
| 96 | 90 | 57 | |
| 126 | 120 | 48 | |
| 186 | 180 | 41 | |
| 216 | 210 | 44 | |
| 306 | 300 | 46 | |
| 364 | 358 | 46 | |

TABLE 14-continued

| Time (Min.)* | Duration (Min.)** | Peak Area | Stream |
|---|---|---|---|
| 508 | 502 | 44 | |
| 604 | 598 | 60 | |
| 812 | 806 | 58 | |
| 876 | 870 | 63 | |
| 892 | 886 | 159 | |
| 908 | 902 | 17,336 | |
| 924 | 918 | 139,962 | |
| 940 | 934 | 163,422 | |
| 956 | 950 | 169,630 | |
| 972 | 969 | 172,181 | |
| 1,276 | 1,270 | 170,481 | |
| 1,340 | 1,334 | 179,849 | |
| 1,404 | 1,398 | 190,826 | |
| 1,468*** | 1,462 | 168,919 | |
| 1,532 | 1,526 | 149,654 | |
| 1,596 | 1,590 | 122,949 | |
| 1,660 | 1,654 | 102,159 | |
| 1,724 | 1,618 | 82,377 | |
| 1,788 | 1,782 | 71,624 | |
| 1,852 | 1,746 | 59,884 | |
| 1,980 | 1,974 | 51,276 | |
| 2,140 | 2,134 | 39,554 | |
| 2,268 | 2,262 | 33,404 | |
| 2,380 | 2,374 | 29,438 | |
| 2,620 | 2,614 | 24,063 | |
| 2,784 | 2,742 | 18,404 | |

*Measured from start of run
**Measured from when stram was fed to the column
***Pure N$_2$ flow started through column after 24 hours From the results reported in Table 14 above, it can be seen that PTMSP is an extremely effective absorbent for removing impurities from a gas stream. The results indicate both high capacity and rates of both absorption and desorption.

Other aspects and embodiments of our invention will occur to those skilled in the art from the foregoing disclosure without departing from the spirit or scope of the invention.

We claim:

1. A process for removing trace organic impurities from water or gas which comprises passing water or gas containing said impurities into a contact zone containing a fixed or moving bed of a bulk absorbent in particulate or granular form comprising solid insoluble polymer of a monomer having the general formula:

$$H_3C-C\equiv C-SiR_3$$

wherein each R is methyl or ethyl, contacting said water or gas with said absorbent, and removing purified water or gas from said zone.

2. The process of claim 1 wherein said polymer is poly[1-(trimethylsilyl)-1-propyne]..

3. The process of claim 2 wherein water is purified by contact with said absorbent.

4. The process of claim 2 wherein gas is purified by contact with said absorbent.

5. The process of claim 1 wherein said fixed or moving bed of absorbent is regenerated to remove absorbed organic material by subjecting said bed to subatmospheric pressure or a stream of gas.

6. The process of claim 1 wherein said water or gas is purified by passage through a series of beds of said absorbent.

* * * * *